May 4, 1965  D. R. KNAUP ETAL  3,181,419
METHOD AND APPARATUS FOR PRODUCING DIALS
Filed Sept. 15, 1961

INVENTORS
David R. Knaup,
James T. Lehmann &
Ralph W. Stockdale
BY Paul J. Ethington
ATTORNEY

United States Patent Office 3,181,419
Patented May 4, 1965

3,181,419
METHOD AND APPARATUS FOR
PRODUCING DIALS
David R. Knaup, Waukesha, James T. Lehmann, Milwaukee, and Ralph W. Stockdale, Greendale, Wis., assignors to General Motors Corporation, Detroit, Mich., a corporation of Delaware
Filed Sept. 15, 1961, Ser. No. 138,480
5 Claims. (Cl. 88—24)

This invention relates to means and methods for producing dials, and more particularly, such means and methods utilizing photographic techniques.

In a shaft position encoder it is frequently desirable to utilize a transparent disc or dial having accurately spaced, opaque line segments to translate analog shaft input into a variety of digital output signals. Such devices are used, for example, in missile guidance systems where it is necessary to achieve very sensitive and accurate measurement of shaft rotation and to encode this information into a form which may be utilized by the system. Heretofore such discs have been produced laboriously by a divided circle machine which photographically produces the opaque segments on a glass master and whereby a separate operation is required for each segment. Then copies of the master are made photographically. Usually only a few dials having the same pattern or number of segments is required yet many different patterns may be needed. Hence it is necessary to be able to easily produce a dial according to given specifications without involving the great expense and time delay inherent in the manufacture of a master pattern by previously used methods.

The purpose of the present invention is to provide a method and apparatus for rapidly and accurately producing segmented dials of the type described directly on photographic film.

The invention is carried out by providing a stroboscopic light source spaced from the film to be exposed, relatively rotating the light source with respect to the film and flashing the stroboscopic light in synchronism with the rotation so that a predetermined number of equally spaced exposures will be made during a single rotation. More specifically, the apparatus used comprises a rotating disc having an aperture near the periphery thereof and a stroboscopic light disposed to shine through the aperture into a camera placed in front of the disc. A motor rotates the disc and a synchronizing circuit flashes the light so that the image of the aperture is reproduced on the film in the camera each time the light flashes.

The above and other advantages of the invention will be made more clear from the following specification taken in conjunction with the accompanying drawings wherein like reference numerals refer to like parts, and wherein.

It is a requirement in the manufacture of shaft position encoder discs that opaque segments be produced on the disc with an extremely high degree of accuracy. For example, a typical requirement is that a dial have 480 segments in a circle and each segment must be within two seconds of arc accuracy, although it is contemplated that such dials will contain from 1 to 5000 or more segments and, of course, more than one concentric circle of segments may be produced on a single dial.

Figure 3:
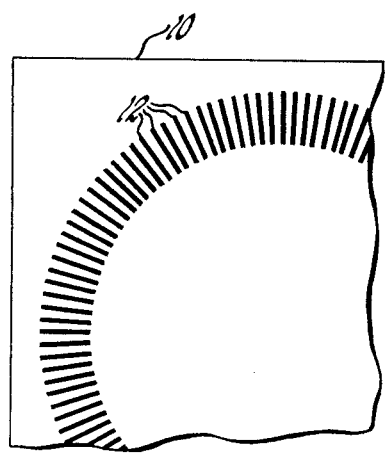
FIGURE 3 is a fragmentary view of a dial produced according to the invention.

FIGURE 3 is illustrative of the type of dial to be produced by this invention and, for purposes of simplicity, illustrates a photographic film 10 having only a single circle of segments 12.

Figure 1:
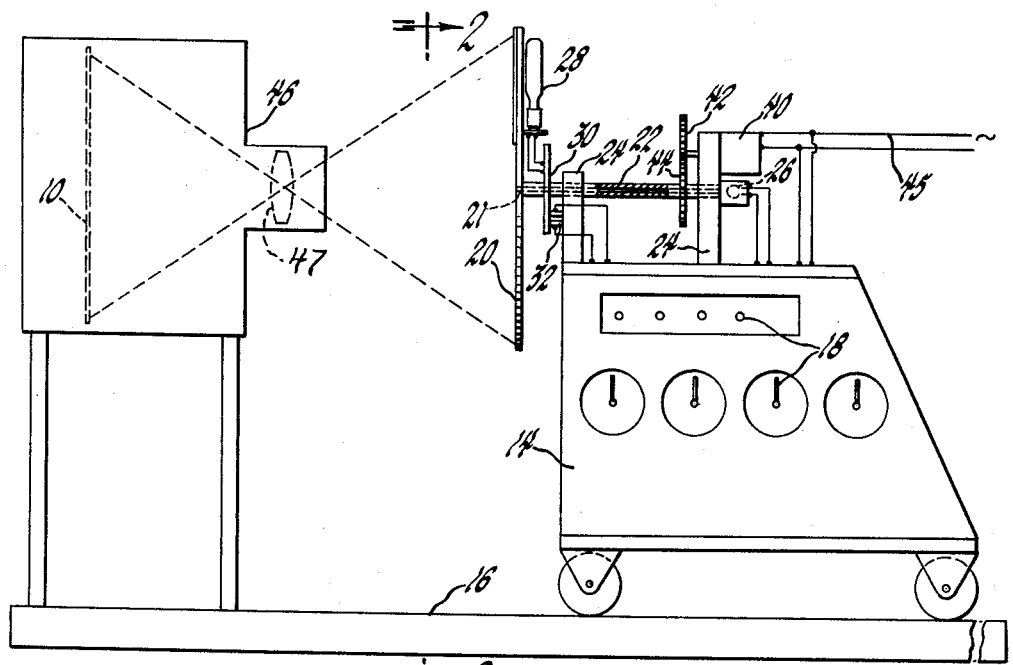
FIGURE 1 is an elevational view of the apparatus for making dials according to the invention.
Figure 2:
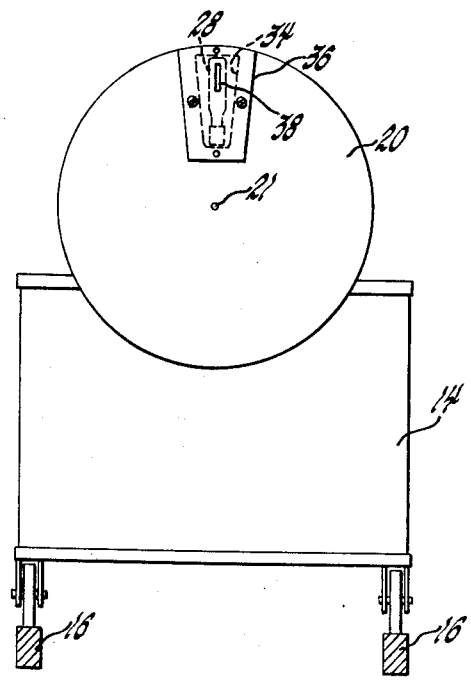
FIGURE 2 is a view of FIGURE 1 taken along lines 2—2.

The apparatus for producing the dials is illustrated in FIGURE 1 and comprises a wheeled cabinet 14 adapted to roll along the rails 16 of a camera bed. The cabinet 14 houses electronic circuitry (not shown) for a stroboscope and carries controls 18 therefor on one side thereof. A rotatable disc 20 with a central opening 21 is secured to a hollow shaft 22 which in turn is mounted atop the cabinet 14 and is rotatably supported by brackets 24. A light bulb 26 is mounted at the rear end of the hollow tube 22 so as to project light through the tube and through the opening 21 in the disc. A stroboscopic lamp 28 is attached to the rotary disc 20 and extends radially therealong. The light is electrically connected to the stroboscope circuitry in the cabinet 14 by slip rings 30 and brushes 32. As best seen in FIGURE 2, an aperture 34 in the disc 20 is located in front of the stroboscopic light 28. An easily removable mask 36 having a slot portion 38 extends across the aperture and is secured to the disc 20 by screws so that the slit 38 will be aligned with the lamp 28. A synchronous A.C. motor 40 is mounted on one of the brackets 24 and drives a gear 42 which meshes with a similar gear 44 secured to the shaft 22. A conventional 60 cycle power line 45 energizes both the motor 40 and the stroboscope circuit. A conventional stroboscope operating circuit is used and is synchronized with the line frequency but can have the flashing rate accurately set for any desired frequency throughout a wide range. Since the speed of the motor 40, and hence the rate of rotation of disc 20, depends upon the line frequency, the stroboscope flashing rate will be synchronized with the rotation of the disc 20.

A camera 46 carrying film 10 and having the usual optical lens 47 is placed in front of the disc 20 so that the optical axis of the camera will be in alignment with the axis of rotation of the disc 20. Then light from the lamp 26 will be projected through the opening 21 into the camera to produce an image corresponding to the axis of rotation, and light from the rotating and flashing stroboscope lamp 28 will produce on the film a circular array of images of the slot 38.

In operation, the mask 36 having a suitable slot 38 is mounted on the disc 20 and the stroboscope is set to a frequency which corresponds to the desired number of segments to be produced on the dial by appropriate manipulation of the controls 18. The distance between the camera 46 and the disc 20 is adjusted so as to determine the size of the dial to be produced, and the camera is focused on the slot 38. The motor 40 is energized and is permitted to operate until the disc 20 attains a stable speed, that is, becomes locked to the line frequency. This speed preferably should be about one revolution per second. Then the stroboscope is turned on for at least one full revolution of the disc whereupon film 10 in the camera is exposed each time the stroboscope light flashes. Accordingly, a circular series of slot images or segments 12 will be produced on the film with a high degree of accuracy and in a very short time. The film is then removed from the camera and developed. Additional dials having the same pattern as that of the first may be produced just as fast as the films in the camera 46 can be exchanged while dials having other patterns may be produced by making the simple distance and stroboscope frequency adjustments described above. Since both the flashing rate of the stroboscope and rotation rate of the disc 20 are determined by the line frequency, slight variations in the line frequency have no effect on the synchronization, and hence, accuracy is inherent in the device.

It should be readily understood that the size and configuration of the segments or mark on the dial is determined by the slot 38 in the mask 36, although the size is further affected by the distance of the disc 20 from the camera. Very high resolution of the segment image 12 is obtained where the disc-to-camera distance is such that a substantial reduction in size of dial produced (compared to the radius of rotation of the slot 38) is effected. It should further be understood that a plurality of concentric dials may be produced on a single film by making successive exposures at different disc-to-camera distances. This result can also be obtained by constructing the apparatus so that the stroboscope lamp 28 and the perforated mask 36 can be adjusted radially on the disc 20.

It is not intended to limit the invention to the specific form described herein, but rather the scope thereof is to be defined by the following claims.

We claim:

1. An apparatus for producing equally spaced dial markings on a photographic film comprising a camera containing said film, a rotatable mask in view of said camera, an aperture defined by said mask, a stroboscopic light disposed to shine through said aperture toward said camera, means for rotating said mask, and means for synchronizing said stroboscopic light with said mask rotation whereby equally spaced exposures are made on said film.

2. An apparatus for producing equally spaced dial markings on a photographic film comprising a camera containing said film, a rotatable disc aligned with the axis of said camera, a slit-like aperture in said disc, a stroboscopic light mounted on said disc and disposed to shine through said aperture toward said camera, means for rotating said disc, and means for synchronizing said stroboscopic light with said disc rotation whereby equally spaced exposures are made on said film.

3. An apparatus for producing equally spaced dial markings on a photographic film comprising a camera containing said film, a rotatable mask in view of said camera, an aperture defined by said mask, a stroboscopic light disposed to shine through said aperture toward said camera, an alternating current motor for rotating said mask, and means responsive to the frequency of said alternating current for synchronizing said stroboscopic light with said mask rotation whereby equally spaced exposures are made on said film.

4. An apparatus for producing equally spaced dial markings on a photographic film comprising a camera containing said film, a rotatable disc aligned with the axis of said camera, a slit-like aperture in said disc, a stroboscopic light mounted on said disc and disposed to shine through said aperture toward said camera, an alternating current motor for rotating said disc, and means responsive to the frequency of said alternating current for synchronizing said stroboscopic light with said disc rotation whereby equally spaced exposures are made on said film.

5. In an apparatus for producing a dial having thereon a plurality of equally spaced markings in a circle concentric with said dial, a camera having a central axis and contining film to be exposed, a rotatable disc axially aligned with said camera, an aperture in said disc, a mask over said aperture defining a slit, a stroboscopic light mounted adjacent said slit and behind said disc relative to said camera to expose said film, alternating current motor means in rotary driving engagement with said disc, the speed of said motor means being determined by the frequency of its power supply, and means for synchronizing the stroboscopic light with the said line frequency whereby the film is exposed to a plurality of equally spaced images of the slit.

References Cited by the Examiner

UNITED STATES PATENTS

| | | |
|---|---|---|
| 2,300,803 | 11/42 | Pattee. |
| 2,488,091 | 11/49 | Meech _____ 88—24 |
| 2,556,586 | 6/51 | Johnston. |
| 2,590,110 | 3/52 | Lippel. |
| 2,758,504 | 8/56 | Tindale _____ 88—24 |
| 2,760,404 | 8/56 | King _____ 88—24 |
| 2,924,138 | 2/60 | Jones. |
| 3,008,372 | 11/61 | Willey et al. _____ 88—24 |
| 3,040,620 | 6/62 | Ferris _____ 88—24 |

NORTON ANSHER, *Primary Examiner.*

WILLIAM MISIEK, *Examiner.*